(12) United States Patent
Waterston (10) Patent No.: US 7,107,196 B2
(45) Date of Patent: Sep. 12, 2006

(54) MODEL CONTROLLER COMPUTER INTERFACE

(75) Inventor: Kenneth Wayne Waterston, Arlington, TX (US)

(73) Assignee: International Business Machines Corporation, Armonk, NY (US)

( * ) Notice: Subject to any disclaimer, the term of this patent is extended or adjusted under 35 U.S.C. 154(b) by 982 days.

(21) Appl. No.: 10/105,139

(22) Filed: Mar. 21, 2002

(65) Prior Publication Data

US 2003/0179176 A1 Sep. 25, 2003

(51) Int. Cl.
*G06G 7/48* (2006.01)
*H04N 7/025* (2006.01)
*B64C 13/04* (2006.01)
*G06F 17/00* (2006.01)
*G06F 19/00* (2006.01)

(52) U.S. Cl. .................. 703/8; 348/211.7; 725/60; 244/234; 463/38

(58) Field of Classification Search .......... 703/8; 725/60; 701/23; 244/234; 463/40, 37, 38, 463/36, 39; 434/374, 40; 348/211.7; 345/161–165; 700/83–86
See application file for complete search history.

(56) References Cited

U.S. PATENT DOCUMENTS

| | | | | |
|---|---|---|---|---|
| 4,531,740 A | * | 7/1985 | Green et al. | 463/38 |
| 5,249,272 A | | 9/1993 | Stern | 710/72 |
| 5,320,538 A | | 6/1994 | Baum | 434/307 R |
| 5,429,363 A | * | 7/1995 | Hayashi | 463/40 |
| 5,793,356 A | * | 8/1998 | Svancarek et al. | 345/161 |
| 5,903,257 A | * | 5/1999 | Nishiumi et al. | 345/157 |
| 6,001,015 A | * | 12/1999 | Nishiumi et al. | 463/38 |
| 6,149,435 A | | 11/2000 | Park et al. | 434/30 |
| 6,293,798 B1 | * | 9/2001 | Boyle et al. | 434/29 |
| 6,511,378 B1 | * | 1/2003 | Bhatt et al. | 463/36 |
| 6,842,804 B1 | * | 1/2005 | Cloud et al. | 710/69 |

OTHER PUBLICATIONS

Microsoft, Jan. 2000 Release of the MSDN Library, 4 separate pages.*
"IEEE 100, The Authoritative Dictionary of IEEE Standards Terms" Seventh Edition, ISBN 0-7381-2601-2, p. 268.*
U.S. Appl. No. 60/353,631 filed on Jan. 31, 2002, 10 pages including 1 Figure.*

* cited by examiner

*Primary Examiner*—Paul Rodriguez
*Assistant Examiner*—Dwin M. Craig
(74) *Attorney, Agent, or Firm*—David A. Mims, Jr.; Robert V. Wilder (57) ABSTRACT

A method and implementing computer system are provided in which an interface device is designed to provide an interface between a remote controller (RC) device for controlling the operation of a vehicle, and a computer system such as a personal computer. The interface device is enabled to receive RC signals from the RC device and convert those RC signals to input signals which are input to a computer system. The interface device builds a translation table for converting the RC or joystick signals to appropriate input signals for the type of vehicle in a particular application. A user is thereby enabled to manipulate an RC device such as a joystick and observe how the user's input joystick movement affects the movement of a simulated controlled vehicle which is displayed on a display screen of the computer system.

17 Claims, 9 Drawing Sheets

| | PC SIDE EXPECTED VALUES | | RC SIDE ACTUAL VALUES | | |
|---|---|---|---|---|---|
| | LOW | HIGH | LOW | HIGH | MULTIPLIER |
| PIN 1 | | | | | |
| PIN 2 | | | | | |
| PIN 3 | | | | | |
| PIN 4 | | | | | |
| PIN 5 | | | | | |
| PIN 6 | | | | | |
| PIN 7 | | | | | |
| PIN 8 | | | | | |
| PIN 9 | | | | | |

*FIG. 11*

MODEL CONTROLLER COMPUTER INTERFACE

FIELD OF THE INVENTION

The present invention relates generally to information processing systems and more particularly to a methodology and implementation for enabling simulation of remotely controllable vehicle movements on a personal computer.

BACKGROUND OF THE INVENTION

In learning to operate vehicles in general, there is always a greater risk of personal injury as well as damage to the vehicle during the learning process itself. For this reason, simulators for vehicles of many types have increased in usage for the purpose of training new operators to manipulate the movements of the vehicle without personal risk or risk of damage to the vehicle itself. The present disclosure is made relative to an example of an airplane model although it is understood that the principles apply also to other vehicles and other vehicle models such as automobiles and boats.

In learning to manipulate the flight of an aircraft model for example, the only way to learn is for a user to actually manipulate a joystick-type of remote control (RC) device and watch a model aircraft fly in the skies in response to the movement of the joystick. The RC signals are transmitted from the remote controller. If a wrong move is made with the joystick, the model plane may crash before corrective action can be taken. In the present example, the RC signals are radio control signals although other means of signal transmission, i.e. other than radio frequency signals, may also be used.

Further, many model operators would like to be able to learn how to operate several different kinds of aircraft models. Heretofore, this could only be accomplished by purchasing the models of interest and test-flying the purchased models.

Thus, there is a need for an improved method and system for enabling a user to simulate operation of a vehicle on a simulation device by which a user may learn to operate the vehicle without incurring a risk of personal injury or damage to the vehicle.

SUMMARY OF THE INVENTION

A method and implementing computer system are provided in which an interface device is designed to provide an interface between a remote controller (RC) device for controlling the operation of a vehicle, and a computer system such as a personal computer. The interface device is enabled to receive RC signals from the RC device and convert those RC signals to input signals which are input to a computer system. The interface device determines the movement characteristics of that vehicle and builds a translation table for converting the RC or joystick signals to appropriate input signals for the type of vehicle in a particular application. The interface device also calibrates and correlates RC movements of a joystick for example, to appropriate and corresponding movements on the particular display size and display area being used in the computer system. A user is thereby enabled to manipulate an RC device such as a joystick and observe how the user's input joystick movement affects the movement of a simulated controlled vehicle which is displayed on a display screen of the computer system.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
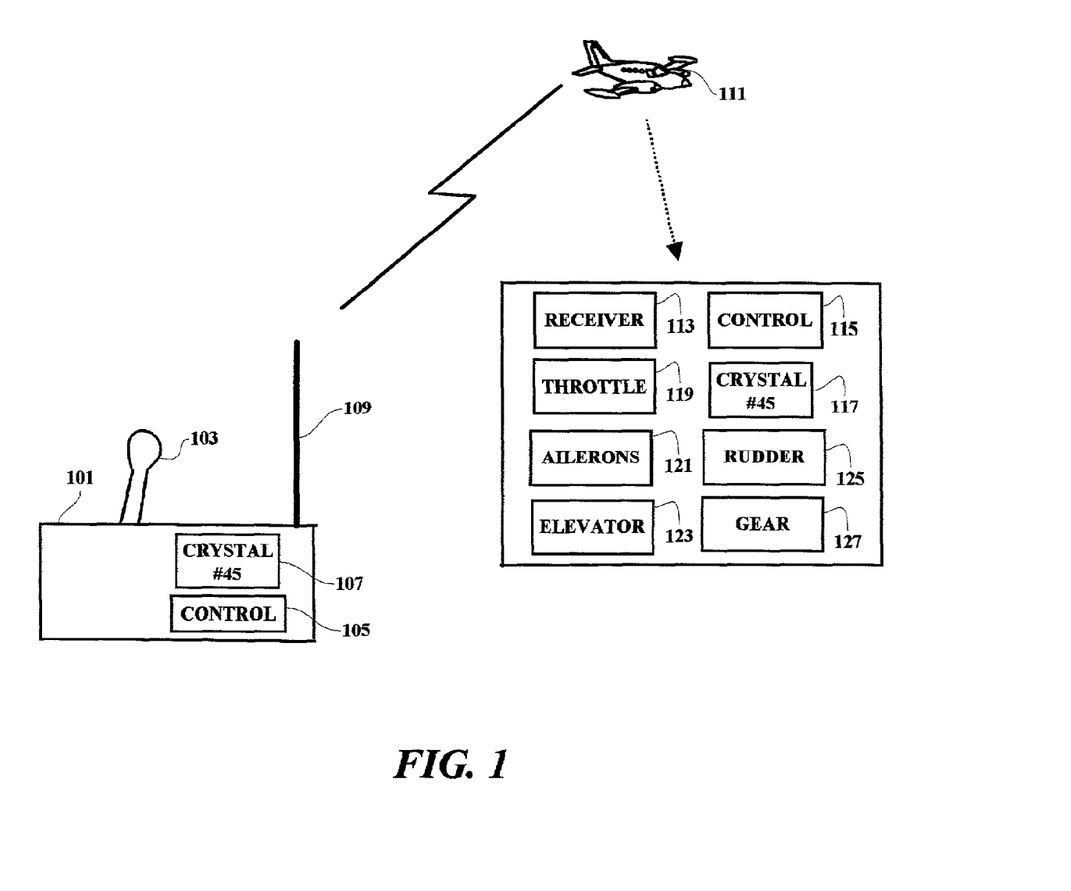
FIG. 1 is a schematic block diagram illustrating several of the control components within a typical model aircraft system.

With reference to FIG. 1, there is shown a schematic block diagram illustrating several of the control components within a typical model aircraft system. A remote control (RC) unit 101 is shown in the example having a movable joystick 103. The RC unit 101 also includes control circuitry 105 for translating joystick movements into RC signals, and a removable crystal device 107 (designated "Crystal #45") for providing a frequency reference for use in transmitting the RC signals through an antenna unit 109 to a controlled model aircraft 111. The crystal device is removable and is inserted into a crystal receptacle on the RC unit. There are different crystals available and each crystal, for example crystal #45, is designed to provide a unique frequency for transmissions between the RC unit and a controlled model aircraft. Two crystal devices are purchased as a pair of matching crystal devices by a user wishing to control a particular model. Generally, one of the crystal devices is inserted into the RC device while the other crystal device 117 is inserted into a model vehicle such as the model aircraft 111. The model aircraft 111 also includes a receiver 113 and a control section 115, as well as control circuitry for throttle control 119, the ailerons 121 the elevator controls 123, the rudder 125 and the gear mechanism control 127, among other controls. As is known in the art, the RC unit 101 includes control mechanisms which are set or adjusted by a user to control the various control servos onboard the model aircraft 111.

Figure 2:
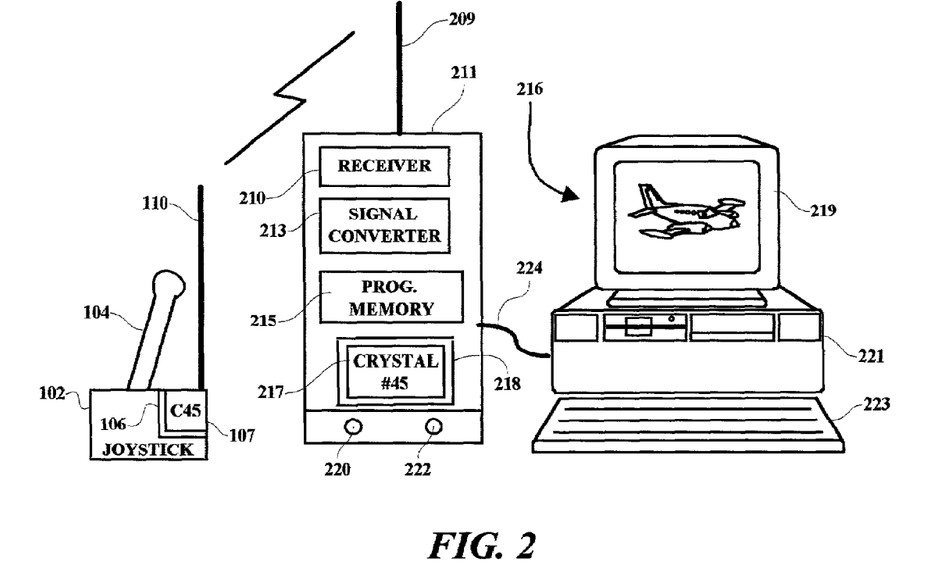
FIG. 2 is an illustration of a simulation system arranged in accordance with the present invention.

As shown in FIG. 2, a simulation system in accordance with the present invention includes an interface unit 211 which is also referred to as a RC-PC interface unit. In the present example, the interface unit 211 is connected between the RC device 102 and a personal computer (PC) 216. The RC unit 102 includes, inter alia, a joystick 104, a crystal device socket 106 and an antenna unit 110. A matching crystal device 218 is plugged into the interface unit 211 to enable communication between the RC unit 102 and the interface unit 211 between RC antenna 110 and interface antenna 209. The interface unit also includes a receiver 210, a signal converter unit 213, a programmable memory device 215 (such as a flash memory), as well as a pair of light emitting diodes (LEDs) or similar indicating devices 220 and 222. One of the LEDs is used to indicate the status of the communication channel between the RC unit 102 and the interface unit 211 while the other LED is used to indicate the status of the communication channel between the interface unit 211 and the PC 216. The PC 216 is connected, in the present example, to the interface unit 211 through a standard Universal Serial Bus (USB) connector 224 and the interface unit is arranged to receive power from the CPU box 221. The PC also includes a keyboard input 223 (and may include other input devices) and a display device 219 which is used to display a simulation of a vehicle being controlled by a user with the RC unit 102.

Figure 3:
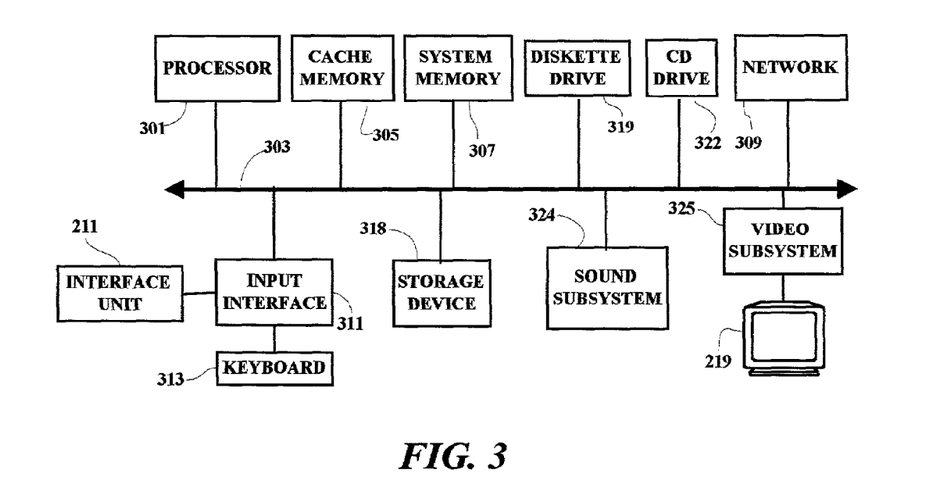
FIG. 3 is a block diagram illustrating several components of the exemplary computer system with connection to the RC-PC interface unit or joystick converter.

In FIG. 3, several of the major components of the PC unit 216 are illustrated. As shown, the RC-PC interface unit 211 is connected to the input interface 311 of the PC. A keyboard 313 and other input devices may also be connected through the input 311 to the main bus 303 of the PC 216. The PC 216 also includes one or more processors, such as processor 301. Also connected to the main bus 303 in the present example, are the following components: a cache memory 305; a system memory 307; a diskette drive 319; a CD drive 322; a network connection device 309; a storage device 318; a sound system 324; a video subsystem 325 and a display device 219 having a display screen.

Figure 4:
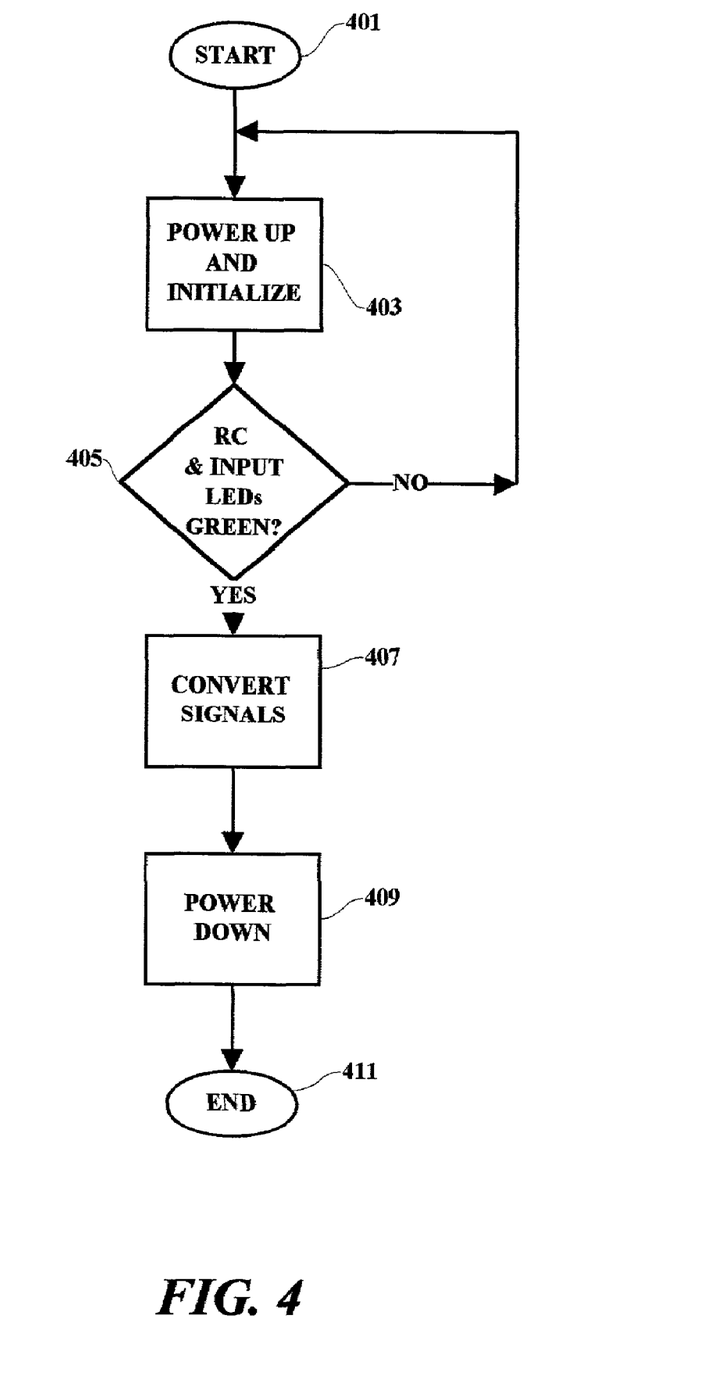
FIG. 4 is a flowchart illustrating an overall sequence of operation for an exemplary embodiment of the present invention.

An overall operation of the exemplary embodiment is illustrated in FIG. 4. When the system is started 401, power-up and initialization functions are performed 403. During this operation, as is hereinafter explained in more detail, it is determined if the communication channels from the RC unit 102 to the interface unit 211 and from the interface unit 211 input to the PC 216 are functional. If either of those channels is not functional 405, then the system re-tries initialization. If both channels of communication are operational 405, then the system begins to convert the RC signals to PC input signals in a steady state mode and displays the controlled aircraft model on the display screen of the PC. When the operator wishes to exit the system, a Power-Down function 409 is performed. The Power-Down function is hereinafter explained in more detail in connection with FIG. 8. After the Power-Down function, 409, the processing ends 411.

Figure 5:
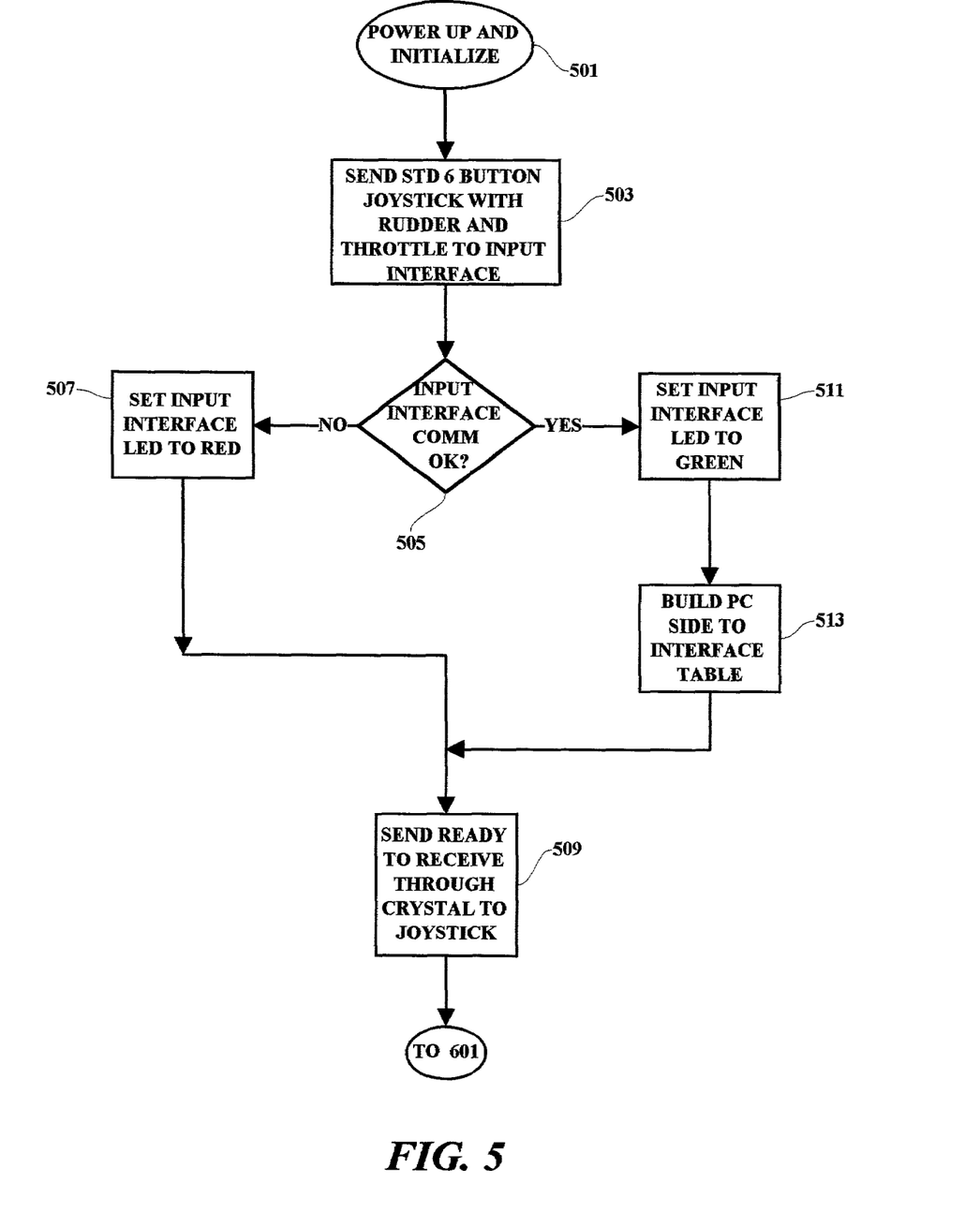
FIG. 5 is a flowchart illustrating a Power-Up sub-routine shown in FIG. 4.

The Power-Up and Initialize block 403 is illustrated in greater detail in FIG. 5. As shown, when the function is called 501, a standard six-button joystick with rudder and throttle information is transmitted 503 from the RC unit 102 to the input interface 311. This is accomplished for the main purpose of checking the operability of the communication channels among the various devices within the system. If the input interface communication channel is not good 505, then an associated LED such as LED 220, is set to red 507 in the present example, and the processing is then ready to receive through the crystal to the joystick 509. If the input interface to the PC checked-out good 505, then the input LED 220 is set to green 511 and a PC side of an interface table is built 513 before the processing is ready to receive crystal to joystick 509. The building of the PC side to the interface table is hereinafter explained in more detail in connection with FIG. 9.

Figure 6:
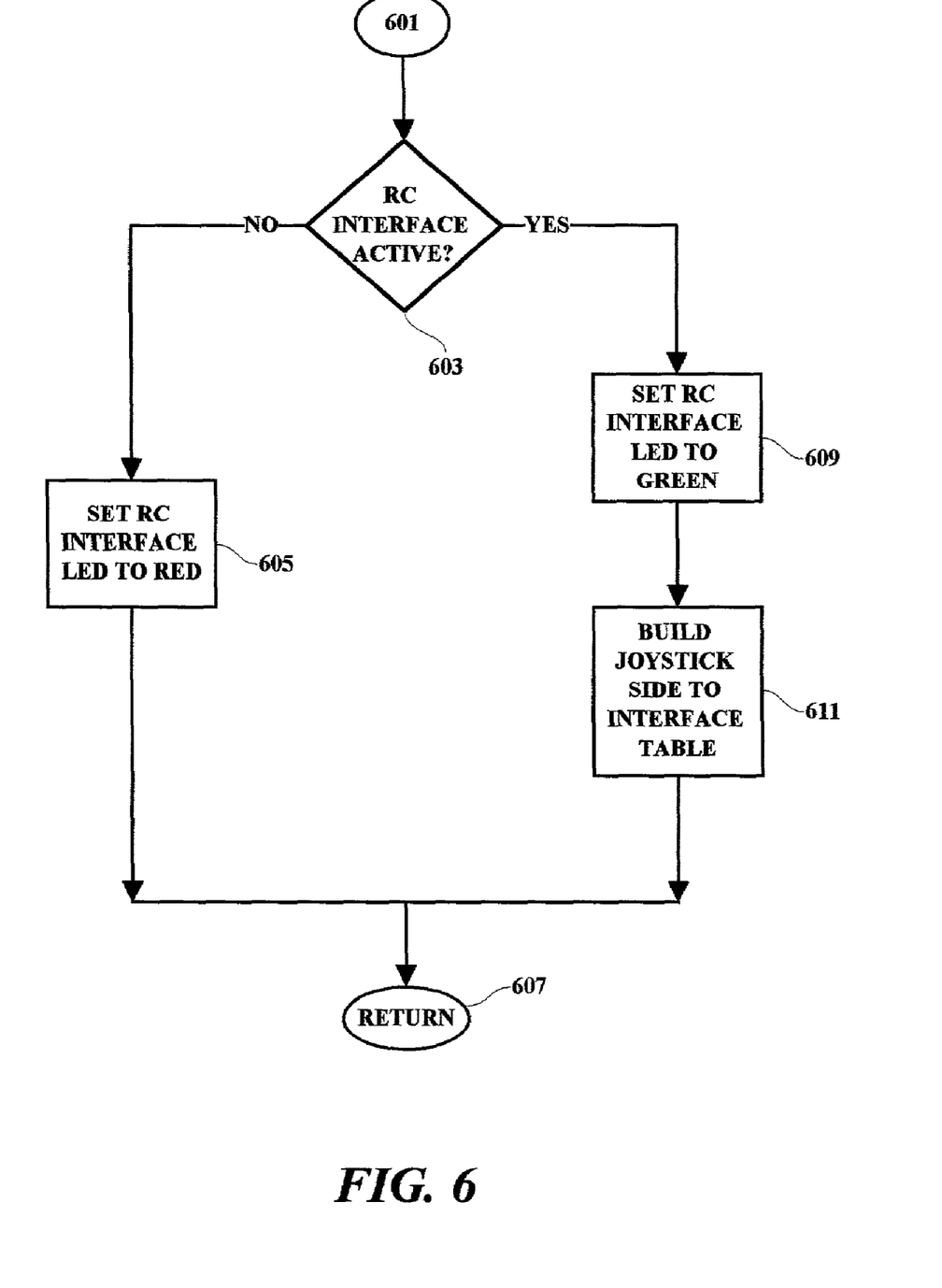
FIG. 6 is a continuation of FIG. 5.

In FIG. 6, the processing continues to determine if the RC interface is active 603. If that channel is not active, then an RC interface LED such as LED 222 is set to red 605, and the processing returns 607 to the sequence shown in FIG. 4. If it is determined that the RC interface communication channel is active 603, then the RC interface LED 222 is set to green 609 and the Joystick or RC side of the Interface table is built-up 611 (as explained in more detail in connection with FIG. 10) before the processing is returned to the FIG. 4 sequence.

Figure 7:
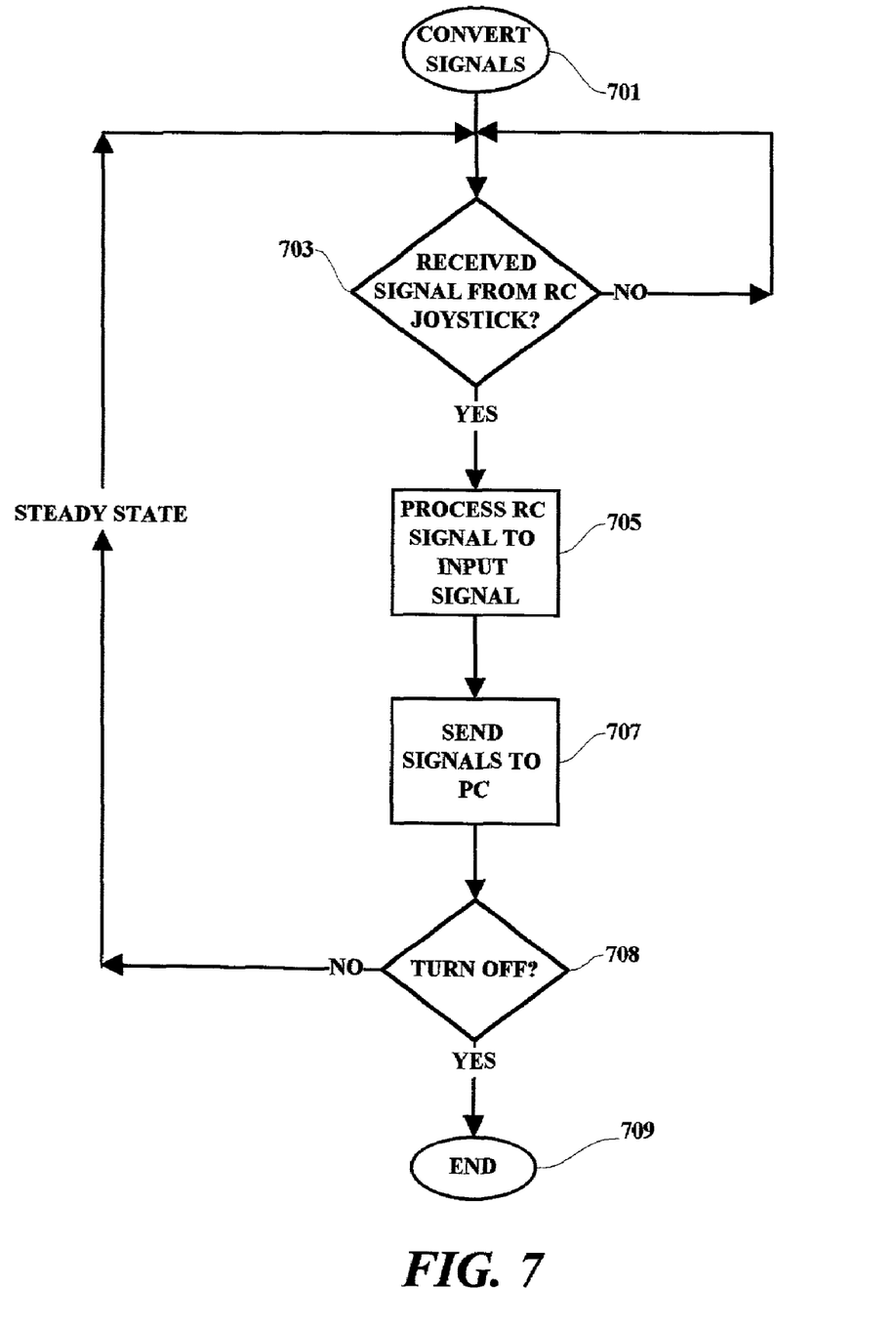
FIG. 7 is a flowchart illustrating a Convert Signals sub-routine shown in FIG. 4.

In FIG. 7, the "convert signals" processing 701 begins by determining 703 when a signal has been received from the RC unit or joystick 102. The processing waits until such a signal is received. After receipt of an RC signal 703, the RC signal is processed by the interface unit 211 to provide a corresponding input signal to the PC 216. This processing includes a "store" function which stores the value of the received RC signal, a "look-up" function in which a PC input corresponding to the received RC signal is "looked-up" from a translation table and a transmit function in which an input signal corresponding to the received RC signal is transmitted 707 to the PC 216 to effect a change in the displayed model aircraft orientation for example. The model aircraft is displayed on the PC display screen against a recognizable background such that changes in aircraft orientation in response to joystick movements can be perceived by the joystick user. The processing continues in this manner in a steady state mode until the user terminates the processing by turning off the power 708 which ends the processing 709.

Figure 8:
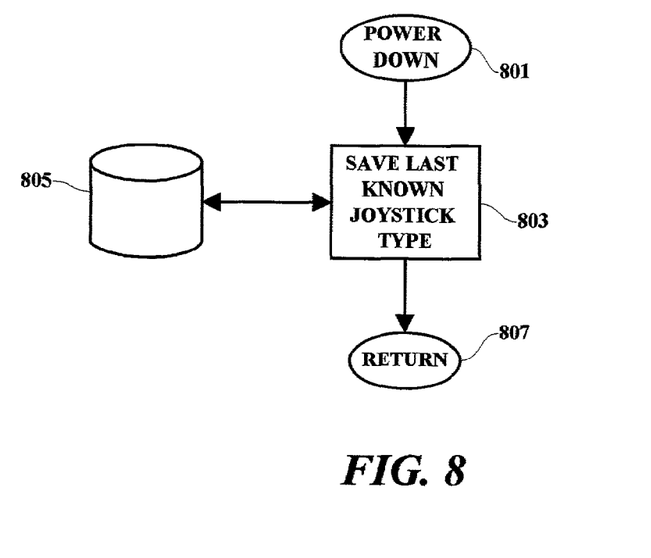
FIG. 8 is a flowchart illustrating a Power-Down sub-routine shown in FIG. 4.

As shown in FIG. 8, in a Power-Down mode 801, the last known joystick type is saved 803 to memory 805, before the processing is returned 807 to be turned off. The memory 805 may comprise the programmable memory 215 which may be a flash memory device.

Figure 9:
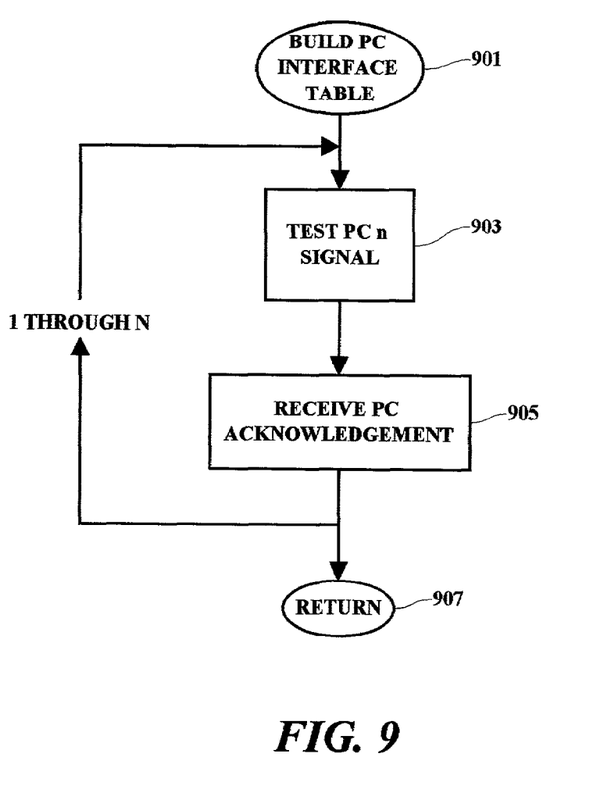
FIG. 9 is a flowchart illustrating an exemplary sequence in the Build PC Interface Table shown in FIG. 5.

In FIG. 9, a PC interface table is built 901 by inputting a series of predetermined test signals 903 to the PC 216 and receiving acknowledgement signals 905 back from the PC 216. After this is accomplished for a series of "N" signals, the process is returned 907 to block 509 in FIG. 5.

Figure 10:
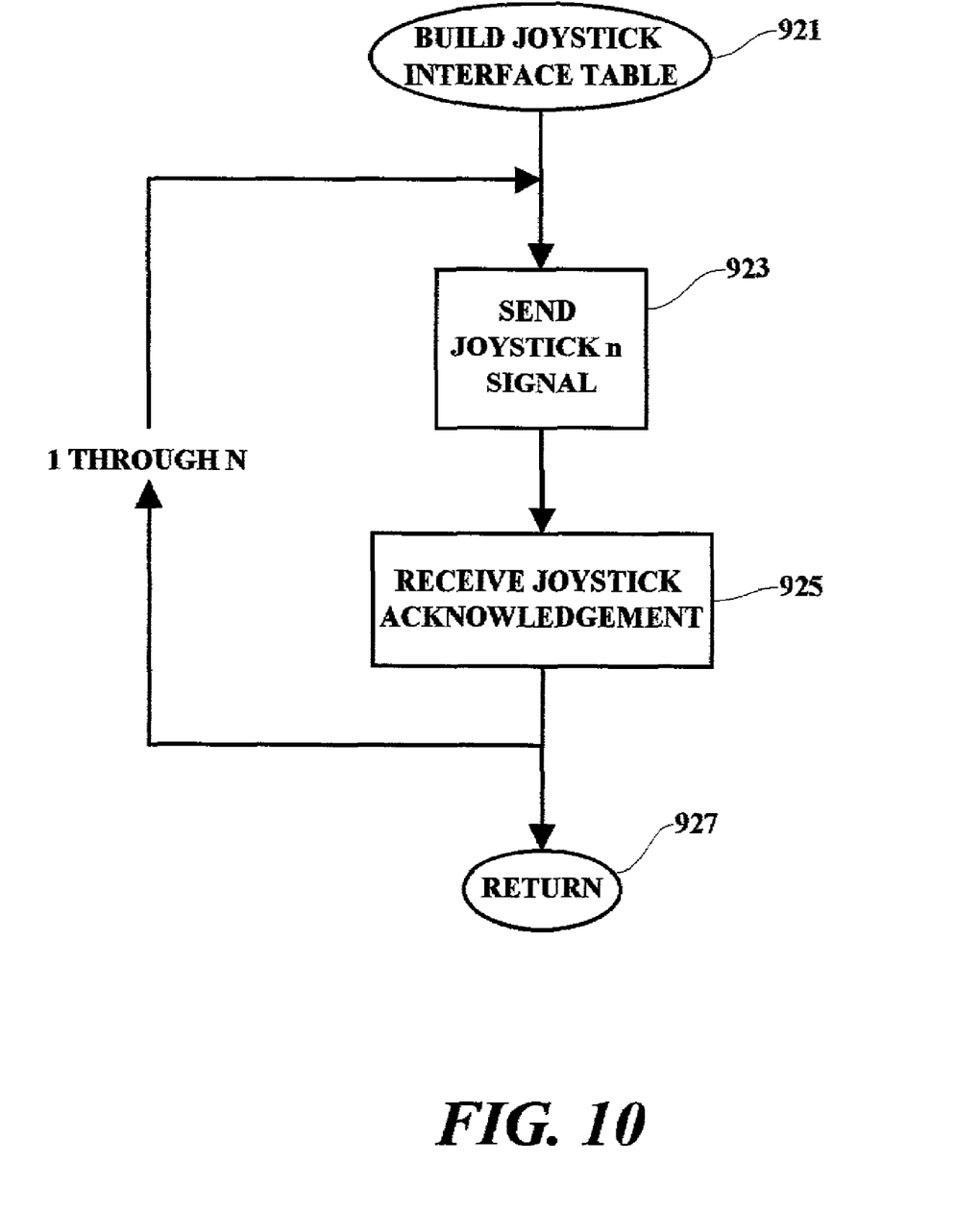
FIG. 10 is a flowchart illustrating an exemplary sequence in the Build Joystick Interface Table shown in FIG. 6.

In FIG. 10, a similar processing is accomplished in building the joystick side of an interface table 921. A series of "N" predetermined test signals are sent 923 to the joystick or RC device 102 and after all acknowledgement signals have been received 925, the processing is returned 927 to block 611 in FIG. 6.

Figure 11:
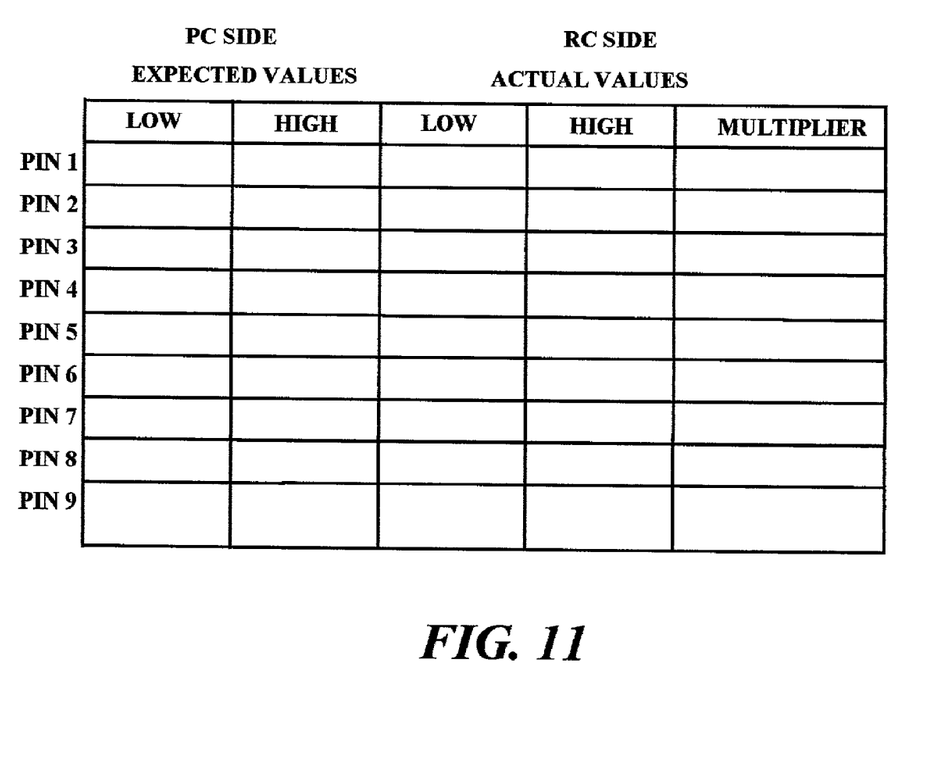
FIG. 11 is an illustration showing an exemplary format for the tables developed by the interface device of the present invention.

In FIG. 11, an exemplary form for the interface table is illustrated. As shown, the table is built-up by the interface unit 211 in response to input received from the RC unit 102. Generally, joystick input is communicated in the form of the frequency of a pulse train. A far left position on a joystick may result in the transmission of a pulse train having a frequency "F1" and a far right position of the joystick may cause a transmission of a signal from the RC unit of a pulse train having a frequency of "F2". These extreme position signals correspond to "Low" and "High" values under the "RC Side Actual Values" columns of the format shown in FIG. 11. Each pin of the connector 224 carries a control signal for different ones of the controllable functions of the particular application. Corresponding high and low values for PC input signals corresponding to the RC signals are also presented in the interface table shown in FIG. 11 under the "PC Side Expected Values" columns. At system start-up, the user is prompted to move the joystick to extreme positions and this extreme position information is input to the interface unit and saved in association with the particular joystick being used. The maximum movement positions of the joystick are also saved for conversion to corresponding positions on a display screen which will vary depending on the size and resolution of the display screen.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a CD, disk or diskette (portable or fixed), or other memory device, from which it may be loaded into memory and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. An interface circuit for use in coupling a remote control (RC) device and a computer system, said RC device including at least one joystick by which a user is enabled to input selected control functions, said computer system having a computer input port for receiving input signals from said interface circuit, said computer system further including a display device, said computer system further including means responsive to said input signals for effecting changes in a displayed image presented on said display device, said interface circuit comprising:
    RC signal receiving means arranged for receiving RC signals transmitted from said RC device, said RC signals being representative of said selected control functions;
    interface circuit output terminal means arranged for providing said input signals to said computer system; and
    signal converter means connected between said RC signal receiving means and said interface circuit output terminal means, said signal converter means being selectively operable for converting said RC signals to said input signals to effect display changes to said displayed image based upon said input signals, said interface circuit further including a memory device, said computer system being selectively operable for building a correlation database for storage in said memory device, said correlation database including information correlating said control functions and said display changes, said interface circuit further including means for supporting a number of different types of said joystick, said interface circuit being operable to build said correlation database based upon a particular type of joystick being used, and wherein said control functions include movements of said joystick, and said display changes include changes of vehicle images presented on said display screen corresponding to said movements of said joystick.

2. The interface circuit as set forth in claim 1 wherein said joystick interface circuit is wirelessly coupled to said RC device.

3. The interface circuit as set forth in claim 1 wherein said vehicle images comprise images representative of predetermined aircraft types.

4. The interface circuit as set forth in claim 1 wherein said vehicle images comprise images representative of predetermined automobile types.

5. The interface circuit as set forth in claim 1 wherein said vehicle images comprise images representative of predetermined boat types.

6. The interface circuit as set forth in claim 1 wherein said interface circuit is selectively operable for receiving movement limit signals from said RC device, said movement limit signals being representative of limits of mechanical movement of said joystick being used, said interface circuit being further selectively operable for correlating said movement limit signals to a screen size of said display device.

7. The interface circuit as set forth in claim 6 wherein said correlating is accomplished each time said computer system is started-up.

8. The interface circuit as set forth in claim 1 wherein said interface circuit is solely connected to said computer system by a Universal Serial Bus (USB) connector device wherein input signals related to each of said control functions are transmitted over a predetermined different ones of connector pins of said USB connector device.

9. The interface circuit as set forth in claim 8 wherein said connector device is an RS232 connector device.

10. The interface circuit as set forth in claim 1 wherein said interface circuit is included on a circuit board within said computer system.

11. A method for initializing a joystick-controlled computer system in which mechanical movements of said joystick are translated into corresponding movements of an image presented on a display, screen, said method comprising:
    powering-up said computer system;
    receiving control signals from said joystick, said control signals being identified with a particular type of joystick;
    building a correlation table based upon control signals received from said joystick, said correlation table including information relating physical movements of said joystick to corresponding movements of said image on said display screen, said image comprising an image of a selected type of aircraft, said method further including sending test signals to said joystick after said power-up, said test signals being effective to test the operability of a communication channel between said joystick and said computer system, determining status of said operability, and providing an indicium representative of said status.

12. The method as set forth in claim 11 wherein control signals are received wirelessly from said joystick.

13. The method as set forth in claim 11 wherein said indicium is located in said computer system to be perceived by a user of said joystick.

14. The method as set forth in claim 13 wherein said indicium is a light-emitting diode (LED).

15. A storage medium including machine readable coded indicia, said storage medium being selectively coupled to a reading device, said reading device being selectively coupled to processing circuitry within a computer system, said reading device being selectively operable for initializing a joystick-controlled computer system in which mechanical movements of said joystick are translated into corresponding movements of a vehicle image presented on a display screen, said method comprising:
    powering-up said computer system;

receiving control signals from said joystick, said control signals being identified with a particular type of joystick;

building a correlation table based upon control signals received from said joystick, said correlation table including information relating physical movements of said joystick to corresponding movements of said vehicle image on said display screen, said vehicle image comprising an image of a selected type of aircraft, said method further including sending test signals to said joystick after said power-up, said test signals being effective to test the operability of a communication channel between said joystick and said computer system, determining status of said operability, and providing an indicium representative of said status.

16. The medium as set forth in claim 15 wherein said control signals are received wirelessly from said joystick.

17. The method as set forth in claim 15 wherein said indicium is a light-emitting diode (LED) located in said computer system to be perceivable by a user of said joystick.

* * * * *